United States Patent
Eichhorn

(10) Patent No.: US 6,281,340 B1
(45) Date of Patent: Aug. 28, 2001

(54) WATER-SOLUBLE DISAZO COMPOUND HAVING ARYLCARBOXAMIDE DIAZO COMPONENTS, PREPARATION THEREOF AND USE THEREOF

(75) Inventor: Joachim Eichhorn, Frankfurt am Main (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/551,999

(22) Filed: Apr. 19, 2000

(30) Foreign Application Priority Data

Apr. 22, 1999 (DE) ............................ 199 18 159

(51) Int. Cl.[7] ........................ C09B 62/513; D06P 1/384
(52) U.S. Cl. ................................ 534/642; 8/549
(58) Field of Search ............................... 534/642

(56) References Cited

U.S. PATENT DOCUMENTS

| | | | |
|---|---|---|---|
| 4,766,206 | 8/1988 | Tzikas | 534/619 |
| 4,929,719 | 5/1990 | Schwander et al. | 534/604 |
| 5,003,052 | 3/1991 | Tzikas | 534/641 |
| 5,010,180 | 4/1991 | Springer et al. | 534/638 |
| 5,071,442 | * 12/1991 | Luttringer et al. | 8/549 |
| 5,081,296 | 1/1992 | Tzikas et al. | 564/166 |
| 5,391,718 | 2/1995 | Tzikas et al. | 534/637 |

FOREIGN PATENT DOCUMENTS 384276 2/1990 (EP).
385204 2/1990 (EP).

OTHER PUBLICATIONS

Araki et al., Chemical Abstracts, 128:116243, 1998.*
Greene et al., Chemical Abstracts, 125:78750, 1996.*
Heyl et al., Chemical Abstracts, 119:103424, 1993.*
Springer et al., Chemical Abstracts, 114: 145438, 1991.*

* cited by examiner

*Primary Examiner*—Fiona T. Powers
(74) *Attorney, Agent, or Firm*—Connolly Bove Lodge & Hutz LLP

(57) ABSTRACT

The present invention relates to reactive dyes of the general formula I

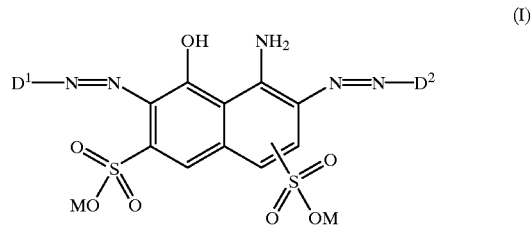

where $D^1$, $D^2$ and M are as defined in the specification.

11 Claims, No Drawings

WATER-SOLUBLE DISAZO COMPOUND HAVING ARYLCARBOXAMIDE DIAZO COMPONENTS, PREPARATION THEREOF AND USE THEREOF

DESCRIPTION

The present invention relates to the technical field of fiber-reactive disazo dyes. Various patent documents disclose disazo dyes which have fiber-reactive dye properties and dye for example cotton in dark blue to black shades. These include dyes which contain a diazo component having a carboxamide function formed from an aromatic carboxylic acid derivative and an aliphatic amine. Examples are DE-A 39 05 074, DE-A 39 05 270, EP-A 208 655, EP-A 221 013, EP-A 284 568, EP-A 309 406, EP-A 381 133 and EP-A 559 617. The application properties of these dyes, for example color strength and build-up behavior as a function of the dyeing process, are in need of improvement in some instances, however.

It has now been found that disazo class reactive dyes based on 1-amino-8-hydroxy-naphthalenedisulfonic acids which contain at least one diazo component having an N arylcarboxamide function formed from an aromatic carboxylic acid derivative and an aromatic amine have improved application properties.

The present invention thus provides reactive dyes of the general formula I

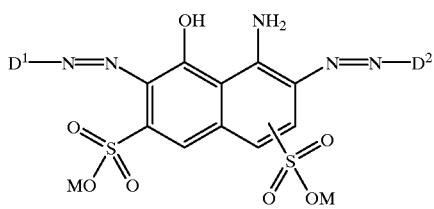

(I)

where $D^1$ and $D^2$ each represent a group of the general formula II

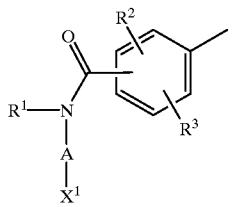

(II)

where $R^1$ is hydrogen, $(C_1-C_4)$-alkyl, aryl or substituted aryl; and $R^2$ and $R^3$ are independently hydrogen, $(C_1-C_4)$-alkyl, $(C_1-C_4)$-alkoxy, hydroxyl, sulfo, carboxyl, amido or halogen;

A is a phenylene group of the general formula III

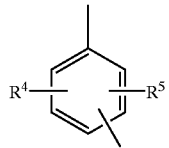

(III)

where $R^4$ and $R^5$ are independently hydrogen, $(C_1-C_4)$-alkyl, $(C_1-C_4)$-alkoxy, hydroxyl, sulfo, carboxyl, amido or halogen;

a naphthylene group of the general formula IV

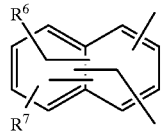

(IV)

where $R^6$ and $R^7$ are independently hydrogen, $(C_1-C_4)$-alkyl, $(C_1-C_4)$-alkoxy, hydroxyl, sulfo, carboxyl, amido or halogen;

or a polymethylene group of the general formula V

(V)

where k is an integer greater than 1; and $R^8$ and $R^9$ are independently hydrogen, $(C_1-C_4)$-alkyl, $(C_1-C_4)$-alkoxy, hydroxyl, cyano, amido, halogen or aryl; and X is hydrogen or $-SO_2-Z$; or represent a phenyl radical of the general formula VI

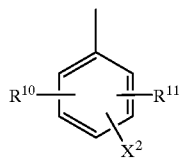

(VI)

where $R^{10}$ and $R^{11}$ are independently hydrogen, $(C_1-C_4)$-alkyl, $(C_1-C_4)$-alkoxy, hydroxyl, sulfo, carboxyl, amido or halogen; and $X^2$ has one of the meanings of $X^1$; or represent a naphthyl radical of the general formula VII

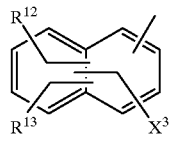

(VII)

where $R^{12}$ and $R^{13}$ are independently hydrogen, $(C_1-C_4)$-alkyl, $(C_1-C_4)$-alkoxy, hydroxyl, sulfo, carboxyl, amido or halogen;

$X^3$ has one of the meanings of $X^1$;
Z is —CH=CH$_2$, —CH$_2$CH$_2$Z$^1$ or hydroxyl,
where
  Z$^1$ is hydroxyl or an alkali-detachable group; and
M is hydrogen or an alkali metal;
  where at least one of D$^1$ and D$^2$ is a group of the general formula II;
  where, if A is a group of the general formula V, R$^1$ is aryl or substituted aryl; and
  where the reactive dye of the general formula I contains at least one —SO$_2$—Z group.

The individual symbols in the general formulae can be identical to or different from each other within the scope of their definitions. (C$_1$–C$_4$)-Alkyl R may be straight-chain or branched and is in particular methyl, ethyl, n-propyl, isopropyol, n-butyl, isobutyl, sec-butyl or tert-butyl. Methyl and ethyl are preferred. The same logic applies to (C$_1$–C$_4$)-alkoxy groups. Aryl R is in particular phenyl. Substituted aryl R$^1$ is in particular phenyl substituted by one, two or three independent groups selected from the group consisting of (C$_1$–C$_4$)-alkyl, (C$_1$–C$_4$)-alkoxy, hydroxyl, sulfo, carboxyl, amido and halogen. Halogen R is in particular fluorine, chlorine or bromine, and chlorine and bromine are preferred.

Alkali-eliminable Z$^1$ in the β-position of the ethyl group of Z include for example halogen atoms, such as chlorine and bromine, ester groups of organic carboxylic and sulfonic acids, as of alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms in each case, such as dimethylamino and diethylamino. Z is preferably vinyl, β-chloroethyl and particularly preferably β-sulfatoethyl.

The groups "sulfo", "carboxyl", "thiosulfato", "phosphato" and "sulfato" include not only their acid form but also their salt form. Accordingly, sulfo groups are groups conforming to the general formula —SO$_3$M, thiosulfato groups are groups conforming to the general formula —S—SO$_3$M, carboxyl groups are groups conforming to the general formula —COOM, phosphato groups are groups conforming to the general formula —OPO$_3$M$_2$ and sulfato groups are groups conforming to the general formula —OSO$_3$M, in each of which M is as defined above.

The dyes of the general formula I may possess different fiber-reactive groups —SO$_2$Z within the meaning of Z. More particularly, the fiber-reactive groups —SO$_2$Z may be on the one hand vinylsulfonyl groups and on the other —CH$_2$CH$_2$Z$^1$ groups, preferably β-sulfatoethylsulfonyl groups. If the dyes of the general formula I contain vinylsulfonyl groups in some instances, then the fraction of the respective dye with the vinyisulfonyl group is up to about 30 mol %, based on the respective amount of total dye.

Alkali M is in particular lithium, sodium or potassium. M is preferably hydrogen or sodium.

k is preferably 2 or 3.

R$^1$ to R$^{13}$ are each preferably hydrogen and R$^6$, R$^7$, R$^{12}$ and R$^{13}$ are each preferably sulfo as well.

When A is phenylene and $X^1$ is —SO$_2$Z, the SO$_2$Z group is preferably disposed meta or para relative to the nitrogen atom. In the group of the general formula II, the carboxamide group is preferably disposed para or meta relative to the diazo group. When A is naphthylene, the bond leading to the nitrogen atom is preferably attached to the naphthalene nucleus in the β-position. When D$^1$ or D$^2$ is a group of the general formula VII, then the bond which leads to the diazo group is preferably attached to the naphthalene nucleus in the β-position.

When D$^1$ or D$^2$ is a group of the general formula VI and $X^2$ is —SO$_2$Z, then the SO$_2$Z group is preferably disposed meta or para relative to the diazo group.

Examples of substituents A are in particular 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene. A is particularly preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups R$^1$ is preferably phenyl or 2-sulfophenyl.

Examples of groups D$^1$ and D$^2$ of the general formulae VI and VII are 2-(β-sulfatoethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-4-(β-sulfatoethylsulfonyl)-phenyl, 2-chloro-5-(β-sulfatoethylsulfonyl)-phenyl, 2-bromo-4-(β-sulfatoethylsulfonyl)-phenyl, 2-sulfo-4-(β-sulfatoethylsulfonyl)-phenyl, 2-sulfo-5-(β-sulfatoethylsulfonyl)-phenyl, 2-methoxy-5-(β-sulfatoethylsulfonyl)-phenyl, 2-ethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2- or 3- or 4-vinylsulfonyl-phenyl, 2-sulfo-4-vinylsulfonyl-phenyl, 2-chloro-4-(β-chloroethylsulfonyl)-phenyl, 2-chloro-5-(β-chloroethylsulfonyl)-phenyl, 3- or 4-(β-acetoxyethylsulfonyl)-phenyl, 6- or 8-(β-sulfatoethylsulfonyl)-naphth-2-yl, 6-(β-sulfatoethylsulfonyl)-1-sulfo-naphth-2-yl and 8-(β-sulfatoethylsulfonyl)-6-sulfo-naphth-2-yl, preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl and 3- or 4-vinylsulfonyl-phenyl.

Preferred reactive dyes according to the invention have the general formula Ia

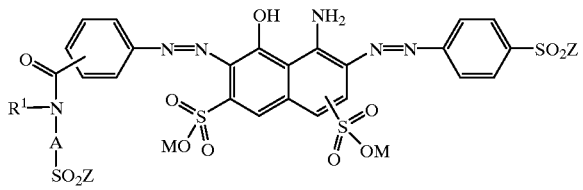

(Ia)

where $R^1$, A and Z are each as defined above. Particularly preferably, A is phenylene and Z is vinyl or β-sulfatoethyl in the general formula Ia.

Most preferably, A is phenylene, $R^1$ is hydrogen and Z is vinyl or β-sulfatoethyl in the general formula Ia.

The disazo dyes of the general formula I may be prepared for example by diazotizing an amine of the general formula VIII

 (VIII)

where $D^2$ is as defined above, in a conventional manner, for example at 5 to +15° C. in a strongly acidic aqueous medium by means of alkali metal nitrite at a pH below 1.5, and then reacting the resulting diazonium compound in an aqueous medium with 1-amino-8-hydroxy-3,6-disulfonic acid (H-acid) or 1-amino-8-hydroxy-4,6-disulfonic acid (K-acid) at a pH of 0 to 2 and a temperature of 0 to 10° C. to form the monoazo dye of the general formula IX

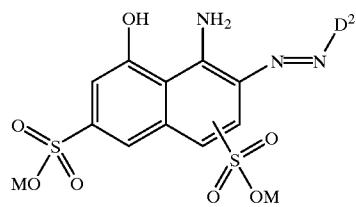

(IX)

where $D^2$ and M are each as defined above, and subsequently diazotizing an amine of the general formula X

 (X)

where $D^1$ is as defined above, in a conventional manner and then coupling the resulting diazonium compound with the monoazo dye of the general formula IX at a pH of 4 to 7.5, preferably 5 to 6, and a temperature of 5 to 20° C., preferably between 10 and 15° C., to form the disazo dye of the general formula I.

The compounds of the general formula I prepared according to the invention may be separated and isolated from their synthesis solutions by generally known methods, for example either by precipitation from the reaction medium by means of electrolytes, such as sodium chloride or potassium chloride, or by addition of an alcohol or by evaporating the reaction solution, for example spray drying, in which case a buffer substance may be added to the reaction solution.

Amines of the general formulae VIII and X containing a group of the formula II may be prepared in a conventional manner (e.g., DE-B-1 126 547), for example by condensing an aromatic primary or secondary amine appropriately substituted with regard to $R^1$ and A with a nitrobenzoyl chloride appropriately substituted with regard to $R^2$ and $R^3$, in an aqueous medium in the presence of a base, for example sodium carbonate, at a pH between 7 and 11 and at temperatures of 50 to 95° C. with subsequent reduction of the nitro group to the amine at a higher temperature, preferably 60 to 95° C., using customary reducing agents, for example sodium hydrogensulfide solution, iron in acidic solution, or by catalytic hydrogenation.

When $X^1$ is —$SO_2Z$ where $Z^1$=hydroxyl, the corresponding amine of the general formula XI

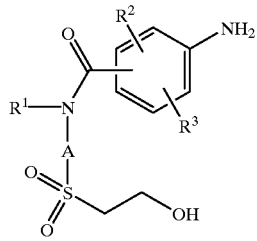

(XI)

where $R^1$ to $R^3$ and A are each as defined above, may be esterified, for example with monohydrate, oleate or using chlorosulfonic acid, and then diazotized or simultaneously esterified and diazotized with nitrosylsulfuric acid, preferably at temperatures of 10 to 30° C., in a conventional manner.

The dyes of the general formula I according to the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogen phosphate, or small amounts of siccatives; if they are present in a liquid, aqueous solution (including the presence of thickeners of the type customary in print pastes), they may also include substances which ensure a long life for these preparations, for example mold preventatives.

In general, the dyes of the general formula I according to the invention are present as dye powders containing 30 to 90% by weight, based on the dye powder or the preparation, of dye. These dye powders may additionally include the aforementioned buffer substances in a total amount of up to 5% by weight, based on the dye powder. If the dyes of the general formula I according to the invention are present in aqueous solution, the total dye content of these aqueous solutions will be up to about 50% by weight, for example between 5 and 50% by weight. The aqueous solutions (liquid preparations) may include the aforementioned buffer substances in an amount which is generally up to 10% by weight, preferably up to 2% by weight.

The solutions obtained in the synthesis of the dyes of the general formula I, if appropriate after addition of a buffer substance and if appropriate after concentrating, may also be used directly in dyeing, as liquid preparations.

The reactive dyes of the general formula I according to the invention have fiber-reactive properties and possess very good dye properties. They can therefore be used for dyeing hydroxyl- and/or carboxamido-containing material, especially fiber material, and also leather.

The present invention therefore also provides for the use of the reactive dyes of the general formula I for dyeing or printing hydroxyl- and/or carboxamido-containing materials, or methods for their application on these substrates. This includes mass coloration, for example films composed of polyamide, and printing. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The reactive dyes of the general formula can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, navy dyeings having very good color yields and excellent color build-up is combined with high fixation yields. Dyeing is carried out in an aqueous bath at temperatures between 40 and 105° C., optionally at temperatures of up to 120° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the reactive dyes of the (general) formula I may also, if desired, only be added to the bath after the actual dyeing temperature has been reached.

However, the reactive dyes of the general formula I are also very useful for saltless or low-salt dyeing and can thus be dyed for example without any salt at low depth of shade, with very little salt such as not more than 5 g/l electrolyte salt at medium depth of shade and with not more than 10 g/l electrolyte salt at higher depths of shade, and in all cases strong dyeings are obtained.

Low depths of shade for the purposes of this invention are depths of shade involving not more than 2 percent by weight of dye being used, based on the substrate. Medium depths of shade are to be understood as meaning more than 2 to not more than 4 percent by weight of dye and higher depths of shade are to be understood as meaning more than 4 to not more than 10 percent by weight of dye, based on the substrate.

This provides for partly distinct reductions not only of the effluent loading of dyehouse wastewaters but also of the associated costs.

The padding process likewise provides excellent color yields coupled with high fixation yields and very good color build-up on cellulose fibers, the dyes being allowed to become fixed on the material by batching at room temperature or at elevated temperature, for example at up to approximately 60° C., by steaming or using dry heat in a conventional manner.

Similarly, the customary printing processes for cellulose fibers, which can be carried out either single-phase, for example by printing with a print paste comprising sodium carbonate or some other acid-binding agent and the reactive dye of the general formula I and by subsequent steaming at 100 to 103° C., or two-phase, for example by printing with print paste comprising a neutral or weakly acidic print colour and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The outcome of the prints is not greatly affected by variations in the fixing conditions.

The fixation yields obtained with the reactive dyes of the general formula I are very high not only in dyeing but also in printing.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the reactive dyes of the general formula I on the cellulose fibers include for example water-soluble basic salts of the alkali metals and the alkaline earth metals of inorganic or organic acids and likewise compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

Treating the reactive dyes of the general formula I with the acid-binding agents with or without heating, binds the dyes chemically to the cellulose fiber. Cellulose dyeings in particular, following the customary aftertreatment by rinsing to remove unfixed dye portions exhibit very good wet fastnesses, in particular since such unfixed dye portions are easily washed off on account of their good solubility in cold water.

Dyeings on polyurethane and polyamide fibers are customarily carried out from an acidic medium. For instance, the dyebath may include acetic acid and/or ammonium sulfate and/or acetic acid and ammonium acetate or sodium acetate in order to obtain the desired pH. To achieve useful levelness for the dyeing, it is advisable to add customary leveling aids, for example based on a reaction product of cyanuric chloride with three times the molar amount of an aminobenzenesulfonic acid and/or an aminonaphthalene-sulfonic acid or based on a reaction product of for example stearylamine with ethylene oxide. Generally the material to be dyed is introduced into the bath at a temperature of about 40° C., agitated therein for some time, and the dyebath is then adjusted to the desired weakly acidic pH, preferably with acetic acid, and the actual dyeing is carried out at a temperature between 60 and 98° C. However, the dyeings can also be carried out at boiling point or at temperatures of up to 120° C. (under pressure).

The dyeings and prints prepared with the reactive dyes of the general formula I according to the invention are notable for bright shades. The dyeings and prints on cellulose fiber materials in particular, as already mentioned, in addition have high color strength, good light- and wet fastnesses and also good hot press and crock fastnesses. Particularly noteworthy are the high yields of fixation obtainable on cellulose fiber materials, which can be above 90%, and also the very good color build-up, including the exhaust method using reduced neutral salt quantities or dispensing with salt altogether, depending on the depth of shade, i.e., depending on the amount of dye used. A further advantage of the reactive dyes of the general formula I is the ease with which portions unfixed in the printing or dyeing process are washed off, as a result of which the wash of the printed or dyed cellulose fiber materials can be accomplished with smaller amounts of wash liquor and, as the case may be, energy-saving temperature control during the wash.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of the free acid. In general they are prepared and isolated in the form of their alkali metal salts, such as lithium, sodium or potassium salts, and used for dyeing in the form of their salts. The starting compounds and components mentioned in the form of the free acid in the examples hereinbelow may similarly be used in the synthesis as such or in the form of their salts, preferably alkali metal salts.

The visible absorption maxima (in nm) reported for the dyes of the invention were determined in aqueous solutions of their alkali metal salts.

PREPARATION EXAMPLE 1

80 parts of concentrated sulfuric acid are admixed with 7 parts of sodium nitrite at not more than 10° C. with cooling, briefly stirred and then heated to 70° C. for 30 min until the nitrite has dissolved. At 20° C. a further 90 parts of concentrated sulfuric acid and also 32 parts of 4-amino-N-(4-((β-hydroxyethyl)sulfonyl)phenyl)benzamide are added up to a temperature of max. 30° C. and the mixture is subsequently stirred at 20–25° C. for 3 hours. The product suspension obtained by simultaneous esterification and diazotization is cooled down and slowly poured onto ice while the temperature is kept at below 20° C. with further ice, and subsequently the excess nitrite is reduced with amidosulfonic acid. The diazonium salt is filtered off on a suction filter, suspended in 75 parts of water and slowly added at 15–20° C. and a pH between 4.5 and 5.5 to a solution in 100 parts of water of 56 parts of a red monoazo dye prepared at pH 0.7–1.5 in a conventional manner by coupling diazotized 1-aminophenyl 4-β-sulfatoethyl sulfone onto 1-amino-8-naphthol-3,6-disulfonic acid (H-acid), while the aforementioned pH of 4.5 to 5.5 is set and maintained with sodium carbonate. Stirring is continued at about 20° C. until the pH remains constant. The resulting navy bisazo dye of the formula with an absorption maximum of 608 nm, may be isolated from the reaction mixture in a conventional manner, for example by salting out with potassium chloride or precipitating by addition of ethanol or by evaporating the dye solution at 50° C. under reduced pressure or by spray drying.

The dye has very good fiber-reactive dye properties and when applied by the methods customary in the art for fiber-reactive dyes, including the exhaust method under low-salt or saltless dyeing conditions, to the materials mentioned in the description, produces dyeings and prints in deep navy shades having good fastness properties.

PREPARATION EXAMPLE 2

32 parts of 4-amino-N-(4-((β-hydroxyethyl)sulfonyl)phenyl)benzamide are introduced into 184 parts of concentrated sulfuric acid at a temperature of up to 30° C. and stirred in for 5 hours. The esterification suspension is gradually poured onto ice, and further ice is added to maintain the temperature below 20° C. The precipitated product is filtered off, and the moist presscake is suspended in 200 parts of water and adjusted to pH 6 with 15.6 parts of sodium carbonate and admixed with 7.6 parts of sodium nitrite (in the form of a 5N aqueous solution). The suspension obtained is gradually added dropwise to a mixture of 100 parts of ice and 22.1 parts of concentrated sulfuric acid and the resulting mixture is stirred at a temperature of 5–10° C. for 1 hour. Excess nitrite is then destroyed with 1N aqueous aminosulfonic acid solution, and the diazonium salt suspension is reacted in the manner of Preparation Example 1 by coupling onto the indicated red monoazo dye 2-(4-(β-sulfatoethylsulfonyl)-phenyl)-azo-3,6-disulfo-1-amino-8-hydroxy-naphthalene to form the navy bisazo dye which may be isolated as indicated in Preparation Example 1 and has similar dye properties to the disazo compound of Preparation Example 1 according to the invention.

PREPARATION EXAMPLE 3

32 parts of 4-amino-N-(3-((β-hydroxyethyl)sulfonyl)phenyl)benzamide are introduced into 202 parts of concentrated sulfuric acid at a temperature of between 20 and 30° C. and the mixture is subsequently stirred at room temperature for 3 hours. The esterification mixture is cooled down to 0 to 10° C. and gradually added to a mixture of 50 parts of ice and 50 parts of water while a further 250 parts of ice are added to keep the temperature below 15° C. The precipitated aminosulfone ester is filtered off after a further 30 minutes of stirring and washed with 50 parts of ice-water. The moist presscake is suspended in 200 parts of water and 100 parts of ice and diazotized with 7.6 parts of sodium nitrite (in the form of a 5N aqueous solution) at a pH of less

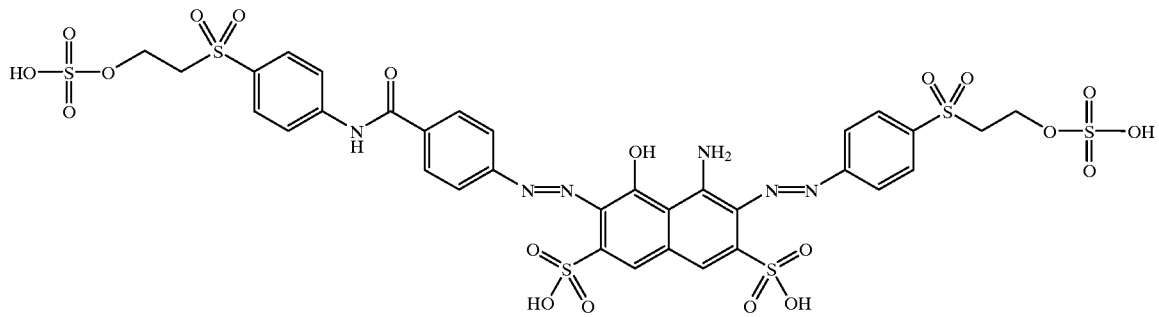

than 1.5 and a temperature of 5 to 10° C. in the course of 2 hours. The excess nitrite is then decomposed with 1N aqueous amidosulfonic acid solution, and the diazonium salt is added to a solution in 100 parts of water of 58 parts of the conventionally prepared red monoazo dye 2-(4-(β-sulfatoethylsulfonyl)-phenyl)-azo-3,6-disulfo-1-amino-8-hydroxy-naphthalene and coupled at a pH of 4.5 to 5.5 and a temperature of 10 to 20° C. to form the bisazo dye. The indicated pH range is set and maintained by addition of solid sodium carbonate. The resulting navy bisazo dye of the formula C. and the mixture is subsequently stirred at room temperature for 3 hours. The esterification mixture is cooled down to 0 to 10° C. and gradually added to 85 parts of ice while a further 250 parts of ice are added to keep the temperature below 20° C. The precipitated aminosulfone ester is filtered off after stirring briefly and introduced into 165 parts of water, adjusted to pH5 with 40 parts of sodium carbonate and admixed with 8 parts of sodium nitrite (in the form of a 5N aqueous solution) The resulting suspension is slowly added dropwise to a mixture of 85 parts of ice and 42 parts of concentrated sulfuric acid and the mixture is stirred at a

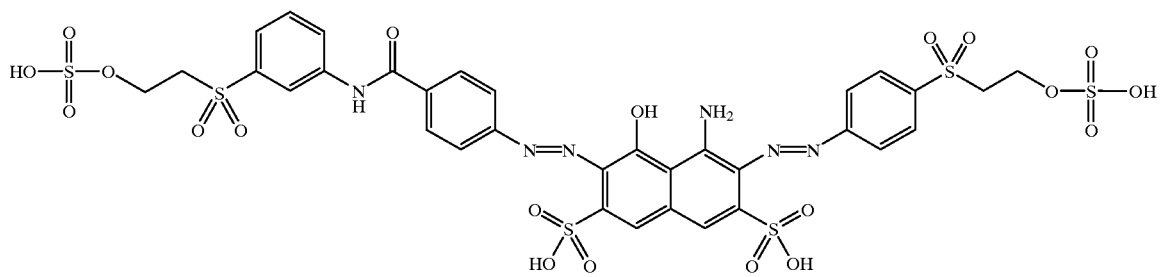

with an absorption maximum of 609 nm, may be isolated from the reaction solution in a conventional manner, for example by salting out with potassium chloride or by evaporating the dye solution under reduced pressure at 50° C.

PREPARATION EXAMPLE 4

32 parts of 4-amino-N-(3-((β-hydroxyethyl)sulfonyl)phenyl)benzamide are esterified and isolated in 202 parts of concentrated sulfuric acid as described in Preparation Example 3. The moist presscake is introduced into 100 parts of water, adjusted to pH6 with 7.8 parts of sodium carbonate, stirred briefly and admixed with 7.6 parts of sodium nitrite (in the form of a 5N aqueous solution). The excess nitrite is then decomposed with 1N aqueous amidosulfonic acid solution, and the diazonium salt suspension is reacted in the manner described in Preparation Example 3 by coupling to the aforementioned red monoazo dye 2-(4-(β-sulfatoethylsulfonyl)-phenyl)-azo- 3,6-disulfo-1-amino-8-hydroxy-naphthalene to form the navy bisazo dye, which may be isolated as indicated in Preparation Example 3.

PREPARATION EXAMPLE 5

32 parts of 3-amino-N-(4-((β-hydroxyethyl)sulfonyl) phenyl)benzamide are introduced into 202 parts of concentrated sulfuric acid at a temperature of between 20 and 30° temperature of 5–10° C. for 1.5 hours. The excess nitrite is then decomposed with 1N aqueous amidosulfonic acid solution, and the diazonium salt suspension is gradually added at 10–20° C. and a pH between 4.5 and 5.5 to a solution of 56 parts of a red monoazo dye prepared at pH 0.7–1.5 in a conventional manner by coupling diazotized 1-aminophenyl 4-(β-sulfatoethyl)-sulfone onto 1-amino-8-naphthol-3,6-disulfonic acid (H-acid), while the aforementioned pH of 4.5 to 5.5 is set and maintained with sodium carbonate. Stirring is continued at about 20° C. until the pH remains constant. The resulting navy bisazo dye of the formula

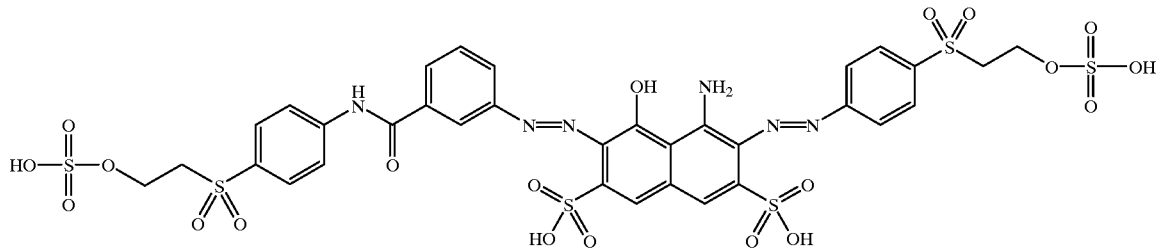

with an absorption maximum of 604 nm, may be isolated from the reaction mixture in a conventional manner, for example by salting out with potassium chloride or precipitating by addition of ethanol or by evaporating the dye solution at 50° C. under reduced pressure or by spray drying.

PREPARATION EXAMPLE 6

80 parts of concentrated sulfuric acid are admixed with 7 parts of sodium nitrite at not more than 10° C. with cooling, briefly stirred and then heated to 70° C. for 30 min until the nitrite has dissolved. At 20° C. a further 90 parts of concentrated sulfuric acid and also 35 parts of 4-amino-N-(2-((β-hydroxyethyl)sulfonyl)ethyl)-N-phenyl-benzamide are introduced up to a temperature of max. 30° C. and the mixture is subsequently stirred at 20–25° C. for 2 hours. The product suspension obtained by simultaneous esterification and diazotization is cooled down and slowly poured onto 50 parts of ice while the temperature is kept at below 20° C. with addition of a further 200 parts of ice, and subsequently the excess nitrite is reduced with amidosulfonic acid. The resulting suspension is gradually added at 15–20° C. and a pH between 4.5 and 5.5. to a solution in 100 parts of water of 55 parts of a red monoazo dye conventionally prepared by coupling diazotized 1-aminophenyl 4-β-sulphatoethyl sulfone onto 1-amino-8-naphthol-3,6-disulfonic acid (H-acid) at pH 0.7–1.5, the cited pH of 4.5 to 5.5 being set and maintained with a total of 174 parts of sodium carbonate. Stirring is continued at about 20° C. until the pH remains constant. The sodium sulfate precipitated from the dye solution is filtered off and any further sodium sulfate is frozen out and filtered off the resulting navy bisazo dye of the formula the course of 10 minutes. A pH between 0.7 and 1.5 is set and maintained with a total of 1.6 parts of sodium bicarbonate and stirring is continued overnight at a temperature between 10 and 20° C. The red monoazo compound thus obtained is subsequently admixed dropwise at a pH between 4.5 and 5.5 and a temperature between 10 and 20° C. with a diazonium salt suspension prepared from 28.4 parts of 1-aminophenyl 4-β-sulfatoethyl sulfone by diazotization in a conventional manner with sodium nitrite in an acidic

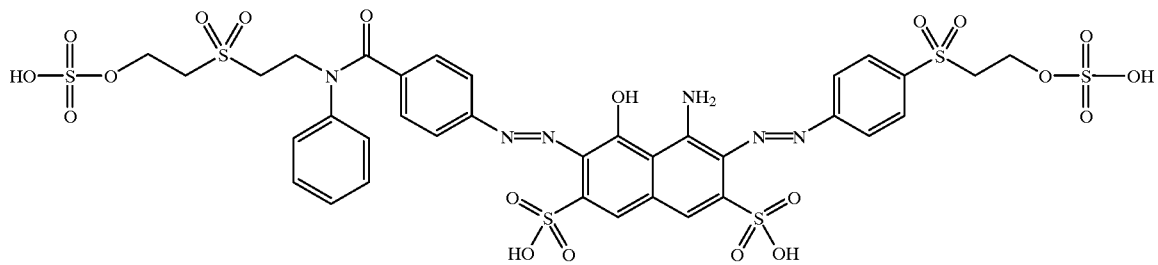

with an absorption maximum of 612 nm, may be isolated from the reaction mixture in a conventional manner, for example by evaporating the dye solution at 50° C. under reduced pressure or by spray drying.

aqueous medium at a temperature between 5 and 10° C. The reported pH range is set and maintained by addition of a total of 23 parts of sodium carbonate. The mixture is stirred overnight and the resulting navy bisazo dye of the formula

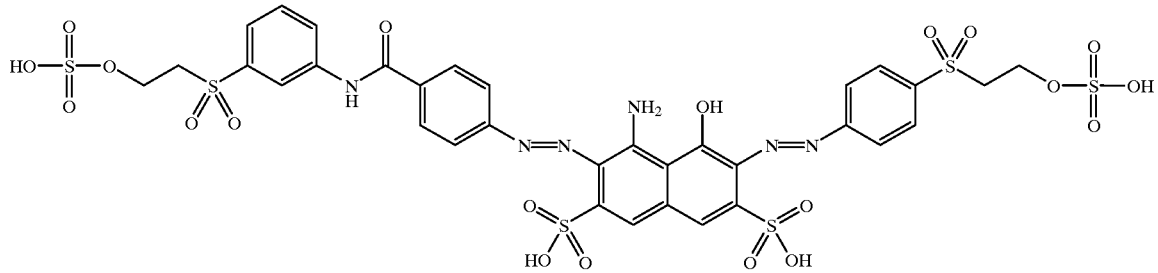

PREPARATION EXAMPLE 7

32 parts of 4-amino-N-(3-((β-hydroxyethyl)sulfonyl) phenyl)benzamide are esterified with 202 parts of concentrated sulfuric acid and isolated, both steps being carried out as described in Preparation Example 3. The moist presscake is introduced into 200 parts of water and admixed with 7.6 parts of sodium nitrite (in the form of a 5N aqueous solution). The resulting suspension is gradually added dropwise to a mixture of 100 parts of ice and 11.6 parts of 31% strength hydrochloric acid and the resulting mixture is stirred at 5–10° C. for 2 hours. The excess nitrite is then destroyed with 1N aqueous amidosulfonic acid solution and 31 parts of 1-amino-8-hydroxy-naphthalene-3,6-disulfonic acid (H-acid) are added to the diazonium salt suspension in with an absorption maximum of 587 nm, is then isolated in a conventional manner, for example by salting out with potassium chloride or by precipitating by addition of ethanol or by evaporating the dye solution at 50° C. under reduced pressure or by spray drying.

PREPARATION EXAMPLES 8–25

The table examples hereinbelow describe further disazo compounds according to the invention in terms of the general formula Ib

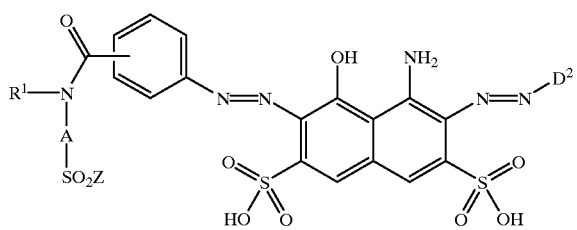

(Ib)

They can be prepared in a manner according to the invention, for example similarly to the abovementioned Preparation Examples 1–6, from the diazo component $D^2$—$NH_2$, 1-amino-8-hydroxy-naphthalene-3,6-disulfonic acid and an amine having an appropriately substituted carboxamide function as further diazo component. They possess very good fiber-reactive dye properties and dye the aforementioned materials, especially cellulose fiber materials, in navy shades having high color strength and good fastnesses.

PREPARATION EXAMPLES 26–46

The table examples which follow describe further reactive dyes according to the invention in terms of the general formula Ic

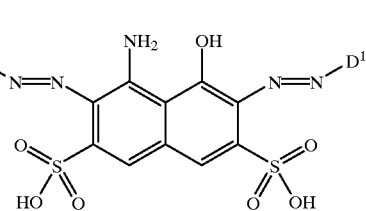

(Ic)

They can be prepared in a manner according to the invention, for example similarly to the abovementioned Preparation Example 7, from an amine having an appropriately substituted carboxamide function as acidic-coupled diazo component, 1-amino-8-hydroxy-naphthalene-3,6-disulfonic acid and the further diazo component $D^1$—$NH_2$. They possess very good fiber-reactive dye properties and dye the materials mentioned in the description, especially cellulose fiber materials, in navy shades possessing high color strength and good fastnesses.

| Ex. | Carboxamide position | A | $R^1$ | Z | $D^2$ |
|---|---|---|---|---|---|
| 8 | para | 2-methoxy-1,5-phenylene | H | 2-sulfatoethyl | 4-(β-sulfatoethyl-sulfonyl)-phenyl |
| 9 | para | 2-chloro-1,5-phenylene | H | 2-sulfatoethyl | 4-(β-sulfatoethyl-sulfonyl)-phenyl |
| 10 | para | 2,5-dimethoxy-1,4-phenylene | H | 2-sulfatoethyl | 4-(β-sulfatoethyl-sulfonyl)-phenyl |
| 11 | para | 2-methoxy-5-methyl-1,4-phenylene | H | 2-sulfatoethyl | 4-(β-sulfatoethyl-sulfonyl)-phenyl |
| 12 | para | 1,3-phenylene | H | 2-sulfatoethyl | 2-sulfo-4-(β-sulfato-ethylsulfonyl)-phenyl |
| 13 | para | 1,3-phenylene | H | 2-sulfatoethyl | 2-chloro-5-(β-sulfato-ethylsulfonyl)-phenyl |
| 14 | para | 1,3-phenylene | H | 2-sulfatoethyl | 2-methoxy-5-(β-sulfatoethyl-sulfonyl)-phenyl |
| 15 | para | 1,3-phenylene | H | 2-sulfatoethyl | 1-sulfo-6-(β-sulfato-ethyl-sulfonyl)-naphth-2-yl |
| 16 | meta | 1,3-phenylene | H | 2-sulfatoethyl | 4-(β-sulfatoethyl-sulfonyl)-phenyl |
| 17 | meta | 2-methoxy-1,5-phenylene | H | 2-sulfatoethyl | 4-(β-sulfatoethyl-sulfonyl)-phenyl |
| 18 | meta | 1,4-phenylene | H | 2-sulfatoethyl | 2-methoxy-5-(β-sulfatoethyl-sulfonyl)-phenyl |
| 19 | para | 1-sulfo-2,6-naphthylene | H | 2-sulfatoethyl | 4-(β-sulfatoethyl-sulfonyl)-phenyl |
| 20 | para | 1,3-propylene | phenyl | 2-sulfatoethyl | 4-(β-sulfatoethyl-sulfonyl)-phenyl |
| 21 | meta | 1,2-ethylene | phenyl | 2-sulfatoethyl | 4-(β-sulfatoethyl-sulfonyl)-phenyl |
| 22 | para | 1,3-phenylene | H | 2-sulfatoethyl | N-(3-((β-sulfatoethyl)-sulfonyl)phenyl)-benzamid-4-yl |
| 23 | para | 1,2-ethylene | phenyl | 2-sulfatoethyl | N-(3-((β-sulfatoethyl)-sulfonyl)phenyl)-benzamid-4-yl |
| 24 | para | 1,3-phenylene | H | 2-sulfatoethyl | 6-sulfo-naphth-2-yl |
| 25 | para | 1,3-phenylene | H | hydroxyl | 4-(β-sulfatoethyl sulfonyl)-phenyl |

| Ex. | Carboxamide position | A | $R^1$ | Z | $D^2$ |
|---|---|---|---|---|---|
| 26 | para | 1,4-phenylene | H | 2-sulfatoethyl | 4-(β-sulfatoethyl-sulfonyl)-phenyl |
| 27 | para | 2-methoxy-1,5-phenylene | H | 2-sulfatoethyl | 4-(β-sulfatoethyl-sulfonyl)-phenyl |
| 28 | para | 2-chloro-1,5-phenylene | H | 2-sulfatoethyl | 4-(β-sulfatoethyl-sulfonyl)-phenyl |
| 29 | para | 2,5-dimethoxy-1,4-phenylene | H | 2-sulfatoethyl | 4-(β-sulfatoethyl-sulfonyl)-phenyl |
| 30 | para | 2-methoxy-5-methyl-1,4-phenylene | H | 2-sulfatoethyl | 4-(β-sulfatoethyl-sulfonyl)-phenyl |
| 31 | para | 1,3-phenylene | H | 2-sulfatoethyl | 2-sulfo-4-(β-sulfatoethyl-sulfonyl)-phenyl |
| 32 | para | 1,3-phenylene | H | 2-sulfatoethyl | 2-chloro-5-(β-sulfatoethyl-sulfonyl)-phenyl |
| 33 | para | 1,3-phenylene | H | 2-sulfatoethyl | 2-methoxy-5-(β-sulfato-ethylsulfonyl)-phenyl |
| 34 | para | 1,3-phenylene | H | 2-sulfatoethyl | 1-sulfo-6-(β-sulfatoethyl-sulfonyl)-naphth-2-yl |
| 35 | meta | 1,4-phenylene | H | 2-sulfatoethyl | 4-(β-sulfatoethyl-sulfonyl)-phenyl |
| 36 | meta | 1,3-phenylene | H | 2-sulfatoethyl | 4-(β-sulfatoethyl-sulfonyl)-phenyl |
| 37 | meta | 2-methoxy-1,5-phenylene | H | 2-sulfatoethyl | 4-(β-sulfatoethyl-sulfonyl)-phenyl |
| 38 | meta | 1,4-phenylene | H | 2-sulfatoethyl | 2-methoxy-5-(fi-sulfato-ethylsulfonyl)-phenyl |
| 39 | para | 1-sulfo-2,6-naphthylene | H | 2-sulfatoethyl | 4-(β-sulfatoethyl-sulfonyl)-phenyl |
| 40 | para | 1,3-propylene | phenyl | 2-sulfatoethyl | 4-(β-sulfatoethyl-sulfonyl)-phenyl |
| 41 | para | 1,2-ethylene | phenyl | 2-sulfatoethyl | 4-(β-sulfatoethyl-sulfonyl)-phenyl |
| 42 | meta | 1,2-ethylene | phenyl | 2-sulfatoethyl | 4-(β-sulfatoethyl-sulfonyl)-phenyl |
| 43 | para | 1,3-phenylene | H | 2-sulfatoethyl | N-(3-((β-sulfato-ethyl)-sulfonyl)-phenyl)-benzamid-4-yl |
| 44 | para | 1,2-ethylene | phenyl | 2-sulfatoethyl | N-(3-((β-sulfatoethyl)-sulfonyl)phenyl)-benzamid-4-yl |
| 45 | para | 1,3-phenylene | H | 2-sulfatoethyl | 6-sulfo-naphth-2-yl |
| 46 | para | 1,3-phenylene | H | hydroxyl | 4-(β-sulfatoethyl sulfonyl)-phenyl |

PREPARATION EXAMPLES 47–68

The table examples hereinbelow describe further disazo compounds according to the invention in terms of the general formula Id

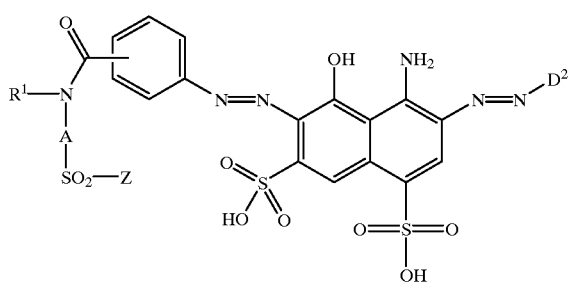

(Id)

They can be prepared in a manner according to the invention, for example similarly to the abovementioned Preparation Examples 1–6, from the diazo component $D^2$—$NH_2$, 1-amino-8-hydroxy-naphthalene-3,6-disulfonioc acid and an amine having an appropriately substituted carboxamide function as further diazo component. They possess very good fiber-reactive dye properties and dye the materials mentioned in the description, especially cellulose fiber materials, in navy shades having high color strength and good fastnesses.

| Ex. | Carboxamide position | A | R¹ | Z | D² |
|---|---|---|---|---|---|
| 47 | para | 1,3-phenylene | H | 2-sulfatoethyl | 4-(β-sulfatoethylsulfonyl)-phenyl |
| 48 | para | 1,4-phenylene | H | 2-sulfatoethyl | 4-(β-sulfatoethylsulfonyl)-phenyl |
| 49 | para | 2-methoxy-1,5-phenylene | H | 2-sulfatoethyl | 4-(β-sulfatoethylsulfonyl)-phenyl |
| 50 | para | 2-chloro-1,5-phenylene | H | 2-sulfatoethyl | 4-(β-sulfatoethylsulfonyl)-phenyl |
| 51 | para | 2,5-dimethoxy-1,4-phenylene | H | 2-sulfatoethyl | 4-(β-sulfatoethylsulfonyl)-phenyl |
| 52 | para | 2-methoxy-5-methyl-1,4-phenylene | H | 2-sulfatoethyl | 4-((β-sulfatoethylsulfonyl)-phenyl |
| 53 | para | 1,3-phenylene | H | 2-sulfatoethyl | 2-sulfo-4-(β-sulfatoethyl-sulfonyl)-phenyl |
| 54 | para | 1,3-phenylene | H | 2-sulfatoethyl | 2-chloro-5-(β-sulfato-ethylsulfonyl)-phenyl |
| 55 | para | 1,3-phenylene | H | 2-sulfatoethyl | 2-methoxy-5-(β-sulfato-ethylsulfonyl)-phenyl |
| 56 | para | 1,3-phenylene | H | 2-sulfatoethyl | 1-sulfo-6-(β-sulfatoethyl-sulfonyl)-naphth-2-yl |
| 57 | meta | 1,4-phenylene | H | 2-sulfatoethyl | 4-(β-sulfatoethylsulfonyl)-phenyl |
| 58 | meta | 1,3-phenylene | H | 2-sulfatoethyl | 4-(β-sulfatoethylsulfonyl)-phenyl |
| 59 | meta | 2-methoxy-1,5-phenylene | H | 2-sulfatoethyl | 4-(β-sulfatoethylsulfonyl)-phenyl |
| 60 | meta | 1,4-phenylene | H | 2-sulfatoethyl | 2-methoxy-5-(β-sulfato-ethylsulfonyl)-phenyl |
| 61 | para | 1-sulfo-2,6-naphthylene | H | 2-sulfatoethyl | 4-(β-sulfatoethylsulfonyl)-phenyl |
| 62 | para | 1,3-propylene | phenyl | 2-sulfatoethyl | 4-((β-sulfatoethylsulfonyl) phenyl |
| 63 | para | 1,2-ethylene | phenyl | 2-sulfatoethyl | 4-(β-sulfatoethylsulfonyl)-phenyl |
| 64 | meta | 1,2-ethylene | phenyl | 2-sulfatoethyl | 4-(β-sulfatoe.thylsulfonyl)-phenyl |
| 65 | para | 1,3-phenylene | H | 2-sulfatoethyl | N-(3-((β-sulfatoethyl)sulfonyl)phenyl)-benzamid-4-yl |
| 66 | para | 1,2-ethylene | phenyl | 2-sulfatoethyl | N-(3-((β-sulfatoethyl)sulfonyl)phenyl)-benzamid-4-yl |
| 67 | para | 1,3-phenylene | H | 2-sulfatoethyl | 6-sulfo-naphth-2-yl |
| 68 | para | 1,3-phenylene | H | hydroxyl | 4-(β-sulfato-ethylsulfonyl)-phenyl |

PREPARATION EXAMPLES 69–90

The table examples hereinbelow describe further disazo compounds according to the invention in terms of the general formula Ie (Ie)

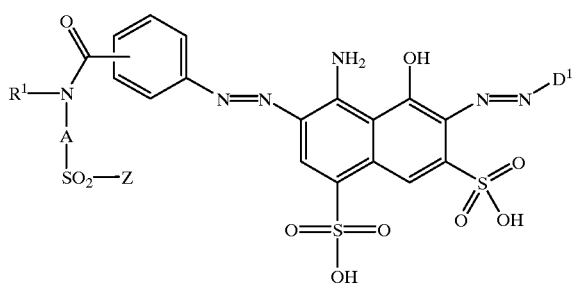

They can be prepared in a manner according to the invention, for example similarly to the abovementioned Preparation Example 7, from an amine having an appropriately substuted carboxamide function as acidic-coupled diazo component, 1-amino-8-hydroxy-naphthalene-3,6-disulfonic acid and the further diazo component $D^1$—$NH_2$. They possess very good fiber-reactive dye properties and dye the materials mentioned in the description, especially cellulose fiber materials, in navy shades possessing high color strength and good fastnesses.

| Ex. | Carboxamide position | A | R¹ | Z | D² |
|---|---|---|---|---|---|
| 69 | para | 1,3-phenylene | H | 2-sulfatoethyl | 4-(β-sulfatoethylsulfonyl)-phenyl |
| 70 | para | 1,4-phenylene | H | 2-sulfatoethyl | 4-(β-sulfato-ethylsulfonyl)-phenyl |
| 71 | para | 2-methoxy-1,5-phenylene | H | 2-sulfatoethyl | 4-(β-sulfato-ethylsulfonyl)-phenyl |
| 72 | para | 2-chloro-1,5-phenylene | H | 2-sulfatoethyl | 4-(β-sulfato-ethylsulfonyt)-phenyl |
| 73 | para | 2,5-dimethoxy-1,4-phenylene | H | 2-sulfatoethyl | 4-(β-sulfato-ethylsulfonyl)-phenyl |
| 74 | para | 2-methoxy-5-methyl-1,4-phenylene | H | 2-sulfatoethyl | 4-(β-sulfato-ethylsulfonyl)-phenyl |
| 75 | para | 1,3-phenylene | H | 2-sulfatoethyl | 2-sulfo-4-(β-sulfato-ethylsulfonyl)-phenyl |
| 76 | para | 1,3-phenylene | H | 2-sulfatoethyl | 2-chloro-5-(β-sulfato-ethylsulfonyl)-phenyl |
| 77 | para | 1,3-phenylene | H | 2-sulfatoethyl | 2-methoxy-5-(β-sulfato-ethylsulfonyl)-phenyl |
| 78 | para | 1,3-phenylene | H | 2-sulfatoethyl | 1-sulfo-6-(β-sulfato-ethylsulfonyl)-naphth-2-yl |
| 79 | meta | 1,4-phenylene | H | 2-sulfatoethyl | 4-(β-sulfato-ethylsulfonyl)-phenyl |
| 80 | meta | 1,3-phenylene | H | 2-sulfatoethyl | 4-(β-sulfato-ethylsulfonyl)-phenyl |
| 81 | meta | 2-methoxy-1,5-phenylene | H | 2-sulfatoethyl | 4-(β-sulfato-ethylsulfonyl)-phenyl |
| 82 | meta | 1,4-phenylene | H | 2-sulfatoethyl | 2-methoxy-5-(β-sulfatoethyl-sulfonyl)-phenyl |
| 83 | para | 1-sulfo-2,6-naphthylene | H | 2-sulfatoethyl | 4-(β-sulfatoethylsulfonyl)-phenyl |
| 84 | para | 1,3-propylene | phenyl | 2-sulfatoethyl | 4-(β-sulfato-ethylsulfonyl)-phenyl |
| 85 | para | 1,2-ethylene | phenyl | 2-sulfatoethyl | 4-(β-sulfato-ethylsulfonyl)-phenyl |
| 86 | meta | 1,2-ethylene | phenyl | 2-sulfatoethyl | 4-(β-sulfato-ethylsulfonyl)-phenyl |
| 87 | para | 1,3-phenylene | H | 2-sulfatoethyl | N-(3-((β-sulfatoethyl)sulfonyl)phenyl)-benzamid-4-yl |
| 88 | para | 1,2-ethylene | phenyl | 2-sulfatoethyl | N-(3-((β-sulfatoethyl)sulfonyl)phenyl)-benzamid-4-yl |
| 89 | para | 1,3-phenylene | H | 2-sulfatoethyl | 6-sulfo-naphth-2-yl |
| 90 | para | 1,3-phenylene | H | hydroxyl | 4-(β-sulfato-ethylsulfonyl)-phenyl |

USE EXAMPLE 1

2 parts of the dye obtained according to Preparation Example 1 or 2 are dissolved in 999 parts of water and 5 parts of sodium carbonate, 0.7 part of sodium hydroxide (in the form of a 32.5% aqueous solution) and optionally 1 part of a wetting agent are added. This dyebath is entered with 100 g of a cotton fabric. The temperature of the dyebath is first maintained at 25° C. for 10 minutes, then raised over 30 minutes to the final temperature (40–60° C.) and maintained at that level for a further 60–90 minutes. Thereafter the dyed material is rinsed initially with tap water for 2 minutes and then with ion-free water for 5 minutes. The dyed material is neutralized at 40° C. in 1000 parts of an aqueous solution containing 1 part of 50% acetic acid for 10 minutes. It is subsequently rinsed with ion-free water at 70° C. and thereafter soaped off at the boil with a detergent for 15 minutes, rinsed once more and dried. This gives a strong navy dyeing having very good fastness properties.

USE EXAMPLE 2

4 parts of the dye obtained according to Preparation Example 1 or 2 and 5 parts of sodium chloride are dissolved in 999 parts of water and 5 parts of sodium carbonate, 0.7 part of sodium hydroxide (in the form of a 32.5% aqueous solution) and optionally 1 part of a wetting agent are added. This dyebath is entered with 100 g of a cotton fabric. The rest of the processing is as indicated in Use Example 1. This gives a strong navy dyeing having very good fastness properties.

USE EXAMPLE 3

8 parts of the dye obtained according to Preparation Example 1 or 2 and 10 parts of sodium chloride are dissolved in 997 parts of water and 5 parts of sodium carbonate, 1.3 parts of sodium hydroxide (in the form of a 32.5% aqueous solution) and optionally 1 part of a wetting agent are added. This dyebath is entered with 100 g of a cotton fabric. The rest of the processing is as indicated in Use Example 1. This gives a strong navy dyeing having very good fastness properties.

What is claimed is:

1. A reactive dye of the general formula I

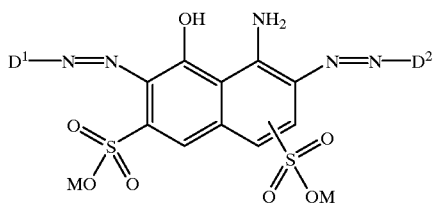

(I)

where

D$^1$ and D$^2$ each represent a group of the general formula II

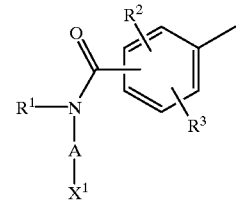

(II)

where

R$^1$ is hydrogen, (C$_1$–C$_4$)-alkyl, aryl or substituted aryl; and

R$^2$ and R$^3$ are independently hydrogen, (C$_1$–C$_4$)-alkyl, (C$_1$–C$_4$)-alkoxy, hydroxyl, sulfo, carboxyl, amido or halogen;

A is a phenylene group of the general formula III

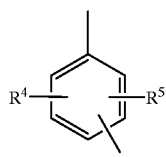

(III)

where

R$^4$ and R$^5$ are independently hydrogen, (C$_1$–C$_4$)-alkyl, (C$_1$–C$_4$)-alkoxy, hydroxyl, sulfo, carboxyl, amido or halogen;

a naphthylene group of the general formula IV

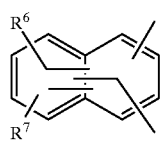

(IV)

where

R$^6$ and R$^7$ are independently hydrogen, (C$_1$–C$_4$)-alkyl, (C$_1$–C$_4$)-alkoxy, hydroxyl, sulfo, carboxyl, amido or halogen; or a polymethylene group of the general formula V —(CR$^8$R$^9$)$_k$—  (V)

where k is an integer greater than 1; and

R$^8$ and R$^9$ are independently hydrogen, (C$_1$–C$_4$)-alkyl, (C$_1$–C$_4$)-alkoxy, hydroxyl, cyano, amido, halogen or aryl; and X$^1$ is hydrogen or —SO$_2$—Z; or represent a phenyl radical of the general formula VI

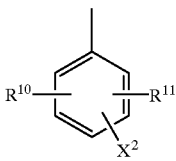

(VI)

where

R$^{10}$ and R$^{11}$ are independently hydrogen, (C$_1$–C$_4$)-alkyl, (C$_1$–C$_4$)-alkoxy, hydroxyl, sulfo, carboxyl, amido or halogen; and X$^2$ has one of the meanings of X$^1$; or represent a naphthyl radical of the general formula VII

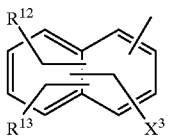

(VII)

where

R$^{12}$ and R$^{13}$ are independently hydrogen, (C$_1$–C$_4$)-alkyl, (C$_1$–C$_4$)-alkoxy, hydroxyl, sulfo, carboxyl, amido or halogen;

X$^3$ has one of the meanings of X$^1$;

Z is —CH=CH$_2$, —CH$_2$CH$_2$Z$^1$ or hydroxyl, where

Z$^1$ is hydroxyl or an alkali-detachable group; and

M is hydrogen or an alkali metal;

where at least one of D$^1$ and D$^2$ is a group of the general formula II;

where, if A is a group of the general formula V, R$^1$ is aryl or substituted aryl; and where the reactive dye of the general formula I contains at least one —SO$_2$—Z group.

2. A reactive dye as claimed in claim 1, wherein R$^1$ to R$^5$ and R$^8$ to R$^{11}$ are each hydrogen and R$^6$, R$^7$, R$^{12}$ and R$^{13}$ are each hydrogen or sulfo.

3. A reactive dye as claimed in claim 1, wherein Z is vinyl, β-chloroethyl or β-sulfatoethyl.

4. A reactive dye as claimed in claim 1, wherein the dye of formula I is a dye of the general formula Ia

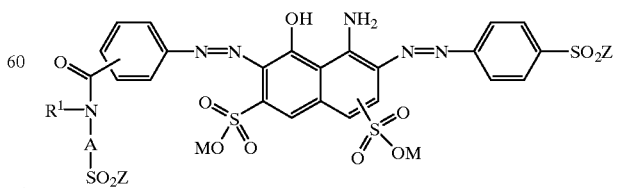

(Ia)

where A, Z and R$^1$ are each as defined in claim 1.

5. A reactive dye as claimed in claim 4, wherein A is phenylene and Z is vinyl or β-sulfatoethyl.

6. A process for preparing a reactive dye as claimed in claim 1, which comprises diazotizing an amine of the general formula VIII

where $D^2$ is as defined in claim 1, then reacting the resulting diazonium compound in an aqueous medium with 1-amino-8-hydroxy-3,6-disulfonic acid (H-acid) or 1-amino-8-hydroxy-4,6-disulfonic acid (K-acid) to form the monoazo dye of the general formula IX

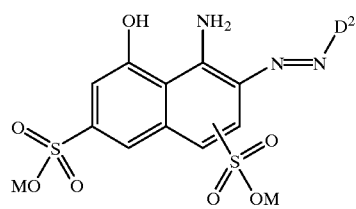

and subsequently diazotizing an amine of the general formula X

where $D^1$ is as defined in claim 1, and then coupling the resulting diazonium compound with the monoazo dye of the general formula IX to form the disazo dye of the general formula I.

7. A process for dyeing or printing a hydroxyl- and/or caboxamido-containing material which comprises contacting the material with the reactive dye as claimed in claim 1.

8. The reactive dye as claimed in claim 1, wherein M is hydrogen or sodium and k is 2 or 3.

9. The reactive dye as claimed in claim 5, wherein M is hydrogen or sodium and k is 2 or 3.

10. The reactive dye as claimed in claim 8, wherein $R^1$ is hydrogen.

11. The reactive dye as claimed in claim 9, wherein $R^1$ is hydrogen.

* * * * *